United States Patent
Pamley et al.

(10) Patent No.: US 10,311,003 B2
(45) Date of Patent: Jun. 4, 2019

(54) DETECTION AND IDENTIFCATION OF SUPPORTED CONNECTION PROTOCOLS IN A MULTI-PURPOSE STORAGE BAY

(71) Applicant: Lenovo (Singapore) Pte. Ltd., Singapore (SG)

(72) Inventors: Marc Richard Pamley, Durham, NC (US); Alan Ladd Painter, Cary, NC (US); Omar Ali Ali, Morrisville, NC (US); Timothy Samuel Farrow, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 682 days.

(21) Appl. No.: 14/226,441

(22) Filed: Mar. 26, 2014

(65) Prior Publication Data
US 2015/0278139 A1    Oct. 1, 2015

(51) Int. Cl.
*G06F 13/20* (2006.01)
*G06F 13/40* (2006.01)

(52) U.S. Cl.
CPC ............... *G06F 13/4022* (2013.01)

(58) Field of Classification Search
CPC .................................................. G06F 13/4022
USPC .......................................................... 710/313
See application file for complete search history.

(56) References Cited

U.S. PATENT DOCUMENTS

| | | | |
|---|---|---|---|
| 2003/0021272 A1* | 1/2003 | Celebioglu | H04L 69/22 370/392 |
| 2011/0038114 A1* | 2/2011 | Pance | G06F 1/1616 361/679.4 |
| 2015/0067226 A1* | 3/2015 | Iskandar | G06F 13/4031 710/309 |

* cited by examiner

*Primary Examiner* — Chun Kuan Lee
(74) *Attorney, Agent, or Firm* — Ference & Associates LLC

(57) ABSTRACT

An embodiment provides a method, including: providing a multi-protocol connector in an electronic device for connecting at least one storage device thereto; determining, using an operative coupling between the multi-protocol connector and the electronic device, if the electronic device supports one or more protocols of the multi-protocol connector; and providing an informational prompt for each determined protocol of the multi-protocol connector that the electronic device supports. Other aspects are described and claimed.

19 Claims, 4 Drawing Sheets

DETECTION AND IDENTIFCATION OF SUPPORTED CONNECTION PROTOCOLS IN A MULTI-PURPOSE STORAGE BAY

BACKGROUND

In a computer, e.g. a tower computer, a storage bay represents that section which accommodates contains one or more storage devices such as one or more hard disk drives (HDDs) and/or solid state drives (SSDs). Typically, the storage devices are connected to one or more connectors disposed on a backplane of the storage bay, to provide an interface with wiring which provides communication with a storage controller. Conventionally, such connectors include pins and channels (or "lanes") that effect such communication.

Conventional connectors are configured to accommodate different storage protocols of storage devices, such as SATA (Serial ATA) and SAS (Serial Attached SCSI, or Small Computer System Interface). With the advent of new storage protocols such as PCIe (PCI Express, or Peripheral Component Interconnect Express), new connectors have been developed to accommodate connections with associated storage devices. One such connector is the SFF-8639, which is able to physically accommodate storage devices using the SATA, SAS and PCIe protocols alike. However, the mere inclusion of such a connector in a backplane provides no guarantee that the computer itself will be able to support a given storage device protocol; for instance, the wiring leading to the storage controller may itself be inadequate for the purpose, let alone the controller itself. Accordingly, there is little that can be done to alleviate the risk of connecting a storage device that will then not function adequately because it is not functionally supported by the computer.

BRIEF SUMMARY

In summary, one aspect provides a method, comprising: providing a multi-protocol connector in an electronic device for connecting at least one storage device thereto; determining, using an operative coupling between the multi-protocol connector and the electronic device, if the electronic device supports one or more protocols of the multi-protocol connector; and providing an informational prompt for each determined protocol of the multi-protocol connector that the electronic device supports.

Another aspect provides an electronic device, comprising: a light emitting element; a multi-protocol connector for connecting at least one storage device thereto; a processor operatively coupled to the multi-protocol connector and the light emitting element; and a memory that stores instructions executable by the processor to: determine, using an operative coupling between the multi-protocol connector and the electronic device, if the electronic device supports one or more protocols of the multi-protocol connector; and provide an informational prompt using the illumination element for each determined protocol of the multi-protocol connector that the electronic device supports.

A further aspect provides a product, comprising: a storage device having code stored therewith, the code being executable by a processor and comprising: code that determines, using an operative coupling between a multi-protocol connector and an electronic device, if the electronic device supports one or more protocols of the multi-protocol connector; and code that provides an informational prompt using an illumination element for each determined protocol of the multi-protocol connector that the electronic device supports.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
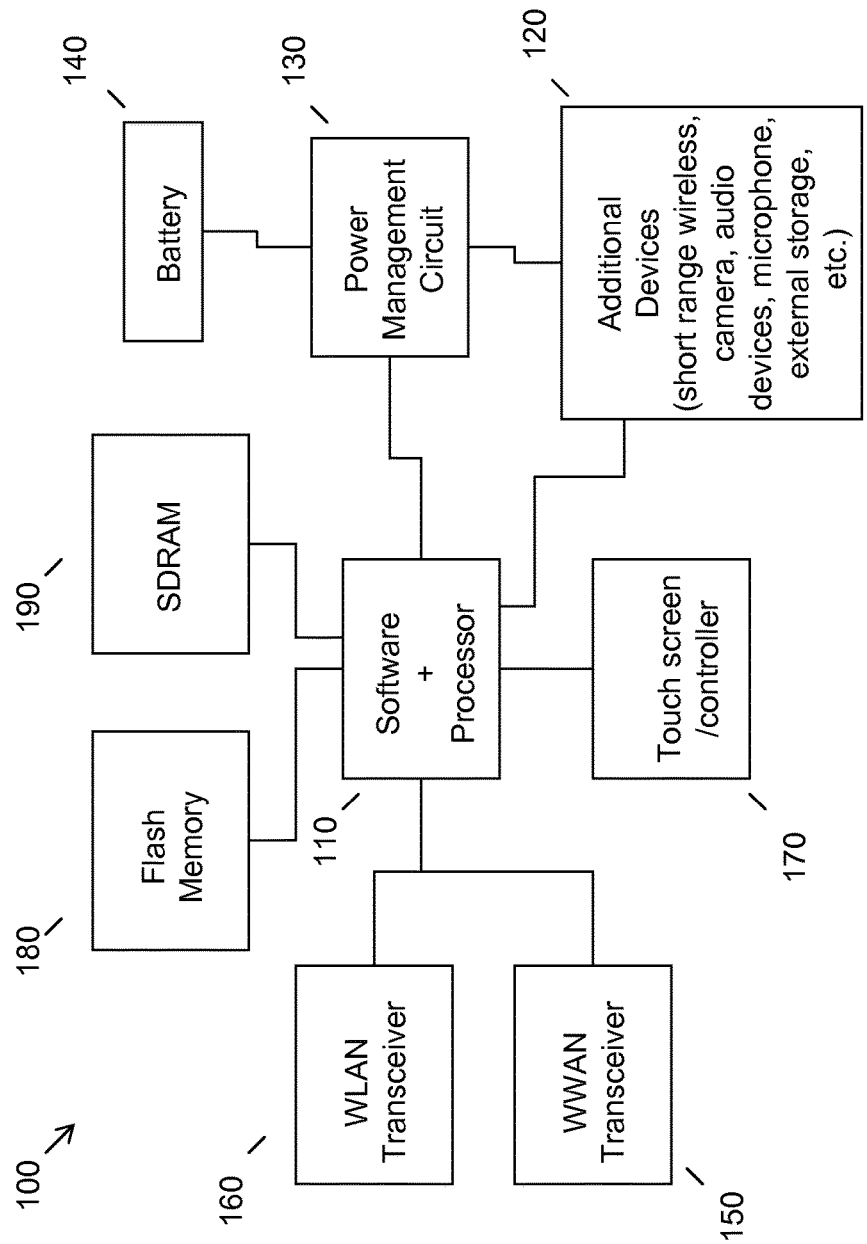
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Current backplane designs in storage bays can accommodate multi-protocol connectors, but there is no guarantee that that all protocols (e.g., SATA, SAS, and PCIe) will be supported by the electronic device (e.g., supported by the storage controller and/or connections thereto). Whether or not the protocols are supported depends on the storage controller options that are configured on the electronic device, as well as whether the wiring from the storage bay's backplane to the controller is capable of transporting them. Without a method to easily identify the protocols supported, a user could incorrectly assume a certain protocol is available on the connector, when it really isn't supported on the device, or vice-versa. Furthermore, since such multi-protocol connectors are physically/mechanically compatible with most HDDs/SSDs, a user could incorrectly plug the wrong type of SSD/HDD into the bay, expecting it to function when it really would not.

Accordingly, an embodiment utilizes an informational prompt, e.g., illuminating one or more elements such as a series of LEDs, associated with each connector. As further described herein by way of non-limiting example, in one embodiment there are "SATA", "SAS", and "PCIe" LEDs on the backplane next to each connector. Whether or not each LED will illuminate depends on what connections the cabling makes back on the electronic device (e.g., PC). For example, if the cabling only connects to a SATA controller, only the SATA LED will illuminate. Similarly, if the cabling connects to controllers supporting "SAS" or "PCIe", those LEDs would also illuminate.

Thus, once a HDD or SSD is plugged into the port, the LEDs associated with that port may be turned off, e.g., to save energy and avoid unnecessary illumination. An embodiment may also provide a cue, e.g., a visual confirmation, that all cabling and controller selections were installed properly during manufacturing assembly, e.g., by virtue of a particular placement of the LEDs, such as on one side of a physical connection element of the multi-protocol connector. Thus, a user may be confident that the connection has been made with the proper orientation.

How the LEDs illuminate may be architected based on the cabling and attachment to the various storage controller options. For example, each storage controller type has unique sideband pins associated with it. By understanding the logic behavior of the sideband pins of the various controllers (low, high, high impedance, etc.), switching logic on the backplane is be able to discern what type of controller is attached, and subsequently illuminate the LEDs for the protocols that is/are supported.

The illustrated example embodiments will be best understood by reference to the figures. The following description is intended only by way of example, and simply illustrates certain example embodiments.

Figure 2:
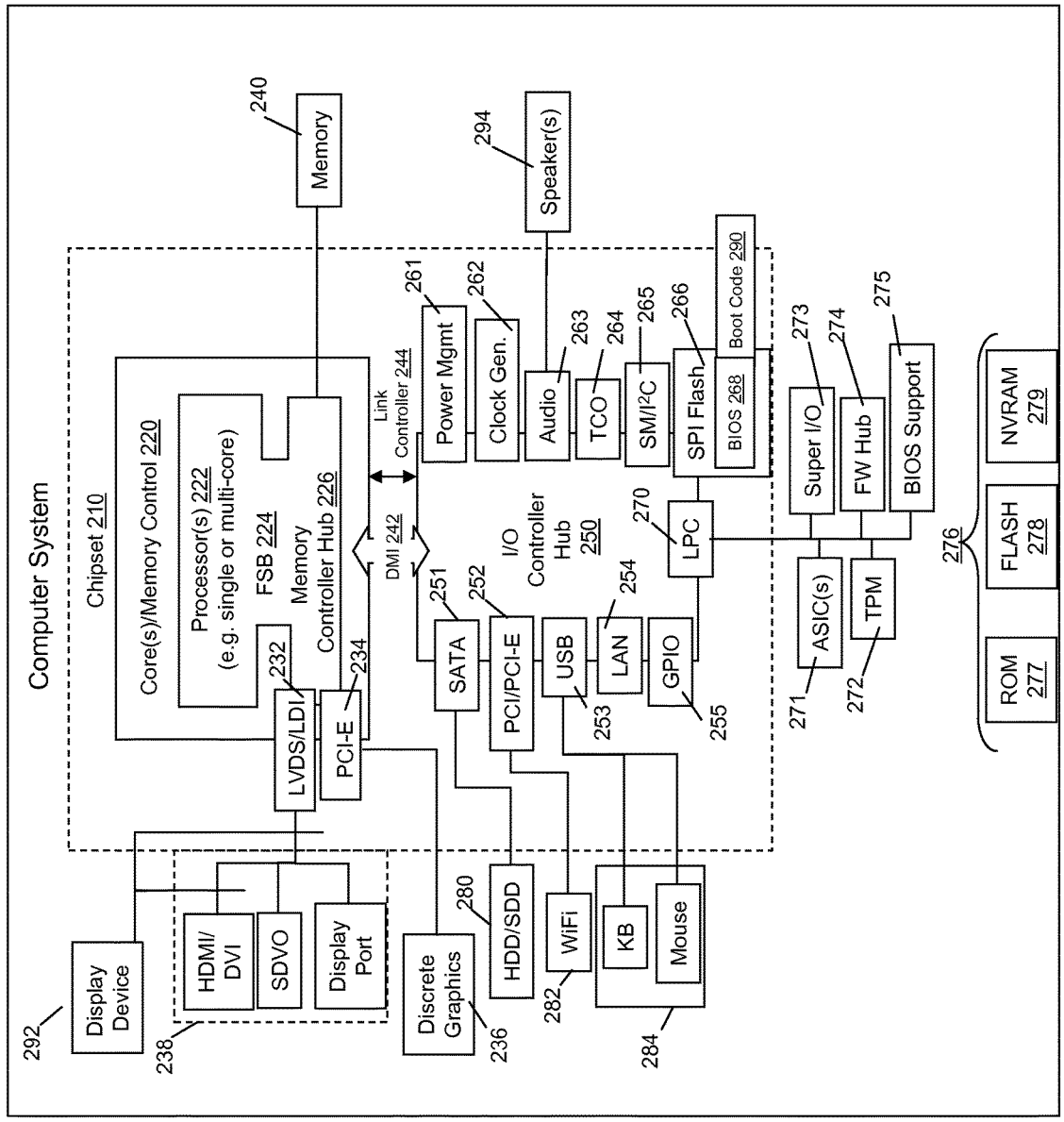
FIG. 2 illustrates another example of an information handling device.

FIGS. 1 and 2 relate to electronic components that may be included in mobile computing platforms and/or laptop computers. It should be understood and appreciated that components illustrated and described with respect to FIGS. 1 and 2, and aspects of the circuitry involved, may also be found and utilized in desktop computer systems and/or CPUs thereof, which themselves may serve as a context for embodiments as broadly contemplated herein.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. Commonly, system 100 will include a touch screen/controller 170 for data input and display. System 100 also typically includes various memory devices, for example flash memory 180 and SDRAM 190.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Figure 3:
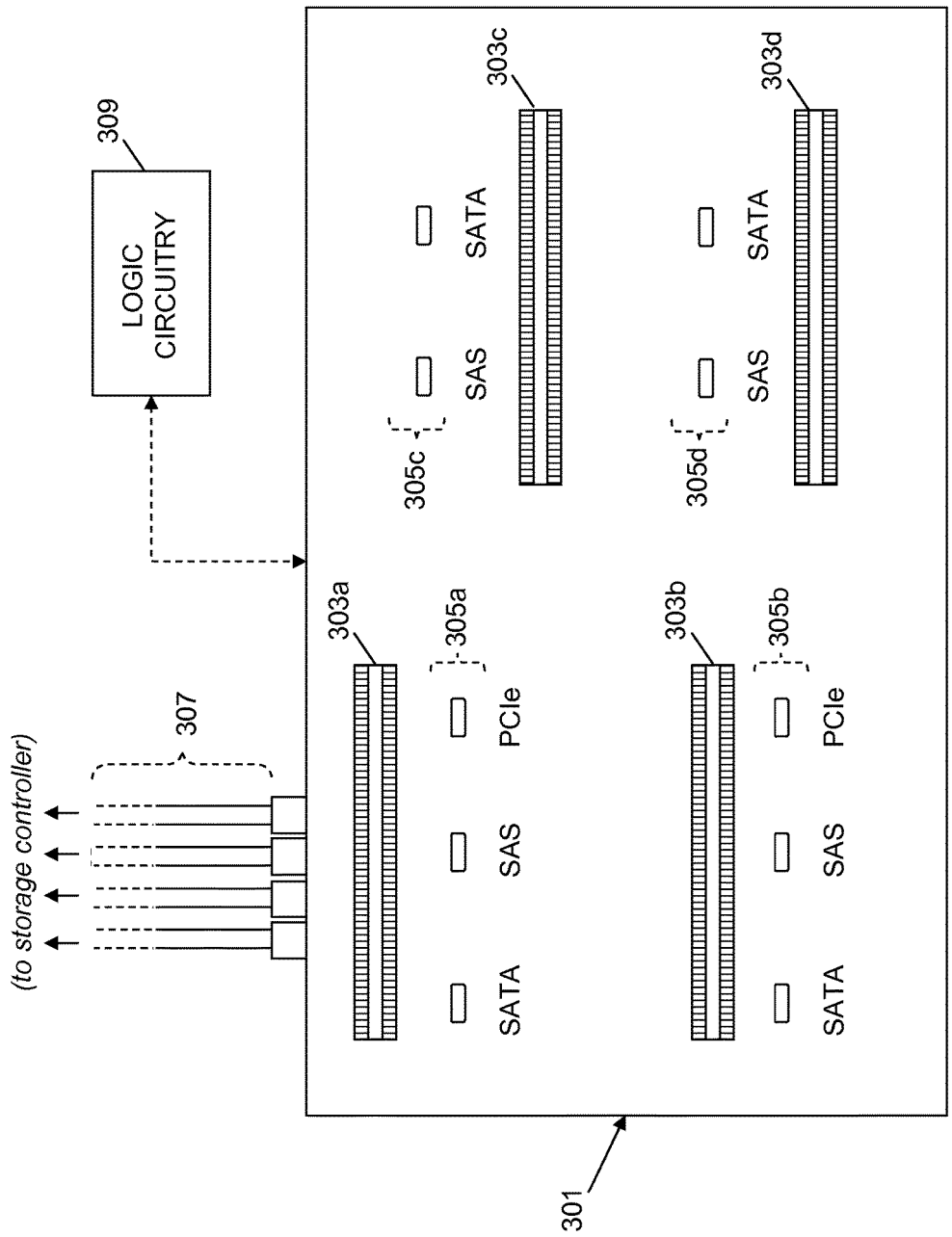
FIG. 3 illustrates front elevational view of a backplane for a storage bay.

By way of example, and referring to FIG. 3, a backplane 301 for a storage bay is illustrated in accordance with an embodiment. Indicated at 303a-d are connectors that are mounted on the backplane 301, and which may each connectively accommodate a storage device such as a HDD or SDD. Such connectors 303a-d may include a plurality of pins and defined channels (or "lanes") which are respectively configured for handling different storage device protocols. Accordingly, some pins and channels may be configured to accommodate a SATA protocol, while others may be configured to accommodate a SAS or PCIe protocol. In the illustrative example shown, connectors 303a and 303b are configured to accommodate storage devices with a SATA, SAS or PCIe protocol while connectors 303c and 303d are configured to accommodate storage devices with a SATA or SAS protocol. As discussed heretofore, connectors 303a and 303b may be of the SFF-8639 type, by way of an illustrative example.

In an embodiment, there are LEDs (light emitting diodes) associated with each of the connectors 303a-d, likewise mounted on backplane 301. Thus, as illustrated, a set 305a-d of LEDs is disposed adjacent each respective connector 303a-d, and each LED is associated with a label indicating a protocol (e.g., SATA, SAS and PCIe). In the illustrative example shown, there are three LEDs associated with each of the connectors 303a and 303b, and two LEDs associated with each of the connectors 303c and 303d.

In an embodiment, cables 307 directing away from backplane 301 provide communication for each of the four connectors 303a-d to a storage controller. For each connector 303a-d, before communication with the storage controller is achieved, and during such a time that no drive is connected with the connector, an LED from the corresponding set 305a-d will illuminate if its corresponding protocol can be supported by the connector. Thus, in the case of connector 303a, if all three labeled protocols can be supported (SAS, SATA and PCIe), then all three of the LEDs in set 305a will be illuminated. To avert continued illumination, any illuminated LEDs may deactivate once a storage device is connected with the corresponding connector 303a-d.

In an embodiment, switching logic circuitry 309 can be provided at the backplane 301 to determine whether a given protocol can be supported via a connector 303a-d. Generally, a storage controller type is understood to be associated with unique sideband pins of a connector, and with an understanding of unique logic behavior of such pins (e.g., low or high impedance), the switching logic 309 can determine the type of storage controller that is in communication with the backplane 301, and then illuminate those individual LEDs among sets 305a-d for the protocol or protocols supported by that storage controller. Thus, if the wiring 307 connects to a storage controller that supports only the SATA protocol, then only those LEDs labeled as "SATA" will illuminate. Accordingly, a user will be able to determine in advance whether a connector 303a-d is capable of supporting one type of drive or another, without needing to actually connect the driver and/or test its functioning via the connector. An additional benefit enjoyed here is that, by way of the LEDs 305a-d, a visual confirmation can immediately be provided that all cabling and controller components were selected and installed properly during manufacturing.

In a variant embodiment, the logic circuitry 309 described heretofore can be configured to additionally determine whether other logistical or physical parameters are sufficient to accommodate a drive with a given storage protocol. Thus, by way of example, a determination could be made as to whether a connector is properly oriented with respect to a backplane in order to physically accommodate a given drive.

Figure 4:
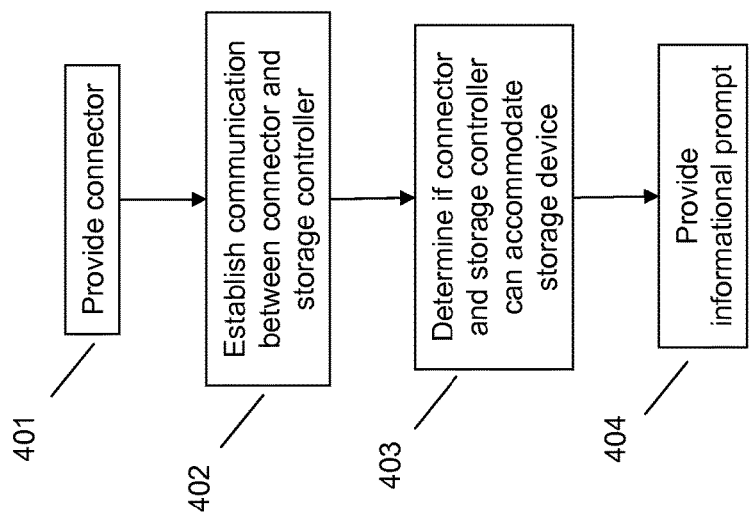
FIG. 4 illustrates an example method of determining compatibility of a connector with at least one storage device.

Referring to FIG. 4, an embodiment may provide a connector for accommodating at least one storage device (401). An embodiment may establish communication between the connector and a storage controller (402), and determine whether the connector and storage controller are able to accommodate a storage device of at least a first type (403). An embodiment may provide an informational prompt upon determining that the connector and storage controller are able to accommodate a storage device of at least the first type (404).

It should be appreciated and understood that a great number of variants are conceivable in addition to those embodiments otherwise discussed and broadly contemplated herein. For instance, while specific mention is made herein of LEDs that may be illuminated to indicate whether a storage bay connector is able to accommodate a drive with a given storage protocol, other types of visual or informational prompts may be used instead of an illuminating LED. For example, other types of illumination may be employed other than an LED. In a variant embodiment, no illumination may be needed at all; instead, a signal could be provided to a computer screen or other visual readout that would prompt a display of text indicating a condition of the connector (e.g., "PCIe capable"). In another variant embodiment, a different illumination protocol may be employed; e.g., an LED or other light-emitting component may illuminate solely if a connector is not able to accommodate a drive with a given storage protocol. For any type of illumination, it is possible to employ steady illumination, flashing illumination or one or more other manners of illumination.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
providing a multi-protocol connector in an electronic device for connecting at least one storage device thereto;
determining, using an operative coupling between the multi-protocol connector and the electronic device, if the electronic device supports one or more protocols of the multi-protocol connector prior to connecting a device to the multi-protocol connector and without communicating with the device; and
providing an informational prompt for each determined protocol of the multi-protocol connector that the electronic device supports.

2. The method of claim 1, wherein said determining comprises determining if the multi-protocol connector is operatively coupled to a storage controller of a particular type.

3. The method of claim 1, wherein said determining comprises determining, using one or more pins of a storage controller of the electronic device and switching logic, a type of the storage controller with respect to a protocol of the multi-protocol connector.

4. The method of claim 1, wherein said providing of an informational prompt comprises illuminating a light-emitting element for each determined protocol of the multi-protocol connector that the electronic device supports.

5. The method of claim 4, further comprising:
detecting a connection of a storage device to the multi-protocol connector; and
thereafter deactivating one or more light-emitting elements.

6. The method of claim 5, wherein the at least one storage device is selected from the group of storage devices consisting of a hard disk drive and a solid state drive.

7. The method of claim 6, wherein the at least one storage device employs one or more protocols of the multi-protocol connector.

8. The method of claim 7, wherein the one or more protocols of the multi-protocol connector is selected from the group of protocols consisting of: a SATA protocol, a SAS protocol and a PCIe protocol.

9. The method of claim 1, wherein the informational prompt is provided at a predetermined position with respect to a physical connection element of the multi-protocol connector.

10. The method of claim 1, further comprising repressing an informational prompt after determining that the connector of the electronic device does not support one or more protocols of the multi-protocol connector.

11. An electronic device, comprising:
a light emitting element;
a multi-protocol connector for connecting at least one storage device thereto;
a processor operatively coupled to the multi-protocol connector and the light emitting element; and
a memory that stores instructions executable by the processor to:
determine, using an operative coupling between the multi-protocol connector and the electronic device, if the electronic device supports one or more protocols of the multi-protocol connector prior to connecting a device to the multi-protocol connector and without communicating with the device; and
provide an informational prompt using the light emitting element for each determined protocol of the multi-protocol connector that the electronic device supports.

12. The electronic device of claim 11, wherein to determine comprises determining if the multi-protocol connector is operatively coupled to a storage controller of a particular type.

13. The electronic device of claim 11, wherein to determine comprises determining, using one or more pins of a storage controller of the electronic device and switching logic, a type of the storage controller with respect to a protocol of the multi-protocol connector.

14. The electronic device of claim 11, wherein to provide of an informational prompt comprises illuminating a light-emitting element for each determined protocol of the multi-protocol connector that the electronic device supports.

15. The electronic device of claim 14, further comprising:
at least one storage device connected to the multi-protocol connector;
wherein the instructions are further executable by the processor to: deactivate one or more light-emitting elements after connection of the at least one storage device with the multi-protocol connector.

16. The electronic device of claim 15, wherein the at least one storage device is selected from the group of storage devices consisting of a hard disk drive and a solid state drive.

17. The electronic device of claim 16, wherein the at least one storage device employs one or more protocols of the multi-protocol connector.

18. The electronic device of claim 17, wherein the one or more protocols of the multi-protocol connector is selected from the group of protocols consisting of: a SATA protocol, a SAS protocol and a PCIe protocol.

19. The electronic device of claim 17, wherein the informational prompt is provided at a predetermined position with respect to a physical connection element of the multi-protocol connector.

\* \* \* \* \*